(12) United States Patent
Widdowson

(10) Patent No.: US 6,752,574 B2
(45) Date of Patent: Jun. 22, 2004

(54) METHOD AND APPARATUS FOR TRANSPORTING A RECREATIONAL VEHICLE

(76) Inventor: Mark Widdowson, #1 Marlin St., Spruce Grove, Alberta (CA), T7X 2L2

( * ) Notice: Subject to any disclaimer, the term of this patent is extended or adjusted under 35 U.S.C. 154(b) by 0 days.

(21) Appl. No.: 10/237,589

(22) Filed: Sep. 6, 2002

(65) Prior Publication Data

US 2003/0049091 A1 Mar. 13, 2003

(30) Foreign Application Priority Data

Sep. 10, 2001 (CA) .............................................. 2356825

(51) Int. Cl.[7] .................................................. B60P 3/07
(52) U.S. Cl. ..................... 410/3; 410/2; 410/7; 410/23; 410/89; 410/97; 410/143
(58) Field of Search ............................. 410/2, 3, 4, 7, 410/23, 89, 97, 143

(56) References Cited

U.S. PATENT DOCUMENTS

| | | | | |
|---|---|---|---|---|
| 4,078,821 A | * | 3/1978 | Kitterman | |
| 4,236,854 A | * | 12/1980 | Rogers | 410/121 |
| 4,921,152 A | | 5/1990 | Kemming | 224/42.42 |
| 5,622,299 A | * | 4/1997 | Berard | 224/403 |
| 5,857,824 A | | 1/1999 | DeAquiar | 414/462 |
| 5,871,316 A | * | 2/1999 | Bills | 410/42 |
| 5,975,819 A | * | 11/1999 | Cola | 410/129 |
| 6,010,287 A | | 1/2000 | Sommermeyer et al. | 410/144 |
| 6,077,007 A | * | 6/2000 | Porter et al. | 410/140 |
| 6,179,181 B1 | | 1/2001 | Johnson et al. | 224/405 |
| 6,213,530 B1 | * | 4/2001 | Bohannon | 296/26.08 |
| 6,511,272 B2 | * | 1/2003 | Stafford | 410/121 |
| 6,582,169 B1 | * | 6/2003 | Cano-Rodriguez et al. | 410/128 |
| 6,598,922 B2 | * | 7/2003 | Morse et al. | 296/26.02 |
| 2002/0031422 A1 | * | 3/2002 | Schilling | 414/477 |
| 2003/0082034 A1 | * | 5/2003 | Barrett | 414/462 |

FOREIGN PATENT DOCUMENTS

| | | | | | |
|---|---|---|---|---|---|
| JP | 403164337 A | * | 7/1991 | | 410/3 |
| WO | 9005074 | * | 5/1990 | | 410/3 |

* cited by examiner

Primary Examiner—Dennis H. Pedder
Assistant Examiner—H. Gutman
(74) Attorney, Agent, or Firm—Christensen O'Connor Johnson Kindness PLLC

(57) ABSTRACT

A method for transporting a recreational vehicle, such as a motorcycle or snowmobile in the cargo box of a pickup truck in a fashion that enables the tail gate of the pickup truck to remain closed. A first step involves providing a pickup truck having a cargo box with an open end closed by a tail gate. A second step involves placing the recreational vehicle in the cargo box of the pickup truck with a rear portion of the recreational vehicle protruding past the open end. A third step involves positioning a support into the cargo box adjacent to the open end. A fourth step involves lifting the rear portion of the recreational vehicle onto the support until the rear portion is elevated sufficiently to provide clearance to enable the open end to be closed by the tail gate.

18 Claims, 7 Drawing Sheets

US 6,752,574 B2

METHOD AND APPARATUS FOR TRANSPORTING A RECREATIONAL VEHICLE

FIELD OF THE INVENTION

The present invention relates to a method and an apparatus for a transporting a recreational vehicle and, in particular, a motorcycle or a snowmobile.

BACKGROUND OF THE INVENTION

When one attempts to transport recreational vehicles, such as motorcycles and snowmobiles, using a short box pick up truck a problem is immediately encountered. The motorcycles and snowmobiles are longer than the box of the pickup truck. Consequently, the tail gate of the pick up truck must be left open during transport.

SUMMARY OF THE INVENTION

What is required is a method and an apparatus that will facilitate the transporting of a recreational vehicle in a pick up truck with the tail gate closed.

According to one aspect of the present invention there is provided a method for transporting a recreational vehicle. A first step involves providing a pickup truck having a cargo box with an open end closed by a tail gate. A second step involves placing the recreational vehicle in the cargo box of the pickup truck with a rear of the recreational vehicle protruding past the open end. A third step involves positioning a support into the cargo box adjacent to the open end. A fourth step involves lifting the rear of the recreational vehicle onto the support until the rear wheel is elevated sufficiently to provide clearance to enable the open end to be closed by the tail gate.

In accordance with the teachings of the method, the rear of the motorcycle or snowmobile is elevated to provide the necessary clearance for the tail gate.

According to another aspect of the invention there is provided an apparatus for transporting a recreational vehicle, comprising in combination a pick up truck, a recreational vehicle and a support. The pickup truck has a cargo box with an open end closed by a tail gate. The recreational vehicle is positioned in the cargo box of the pickup truck with a rear of the recreational vehicle protruding past the open end. The support is positioned in the cargo box adjacent to the open end. The rear of the recreational vehicle is rested upon the support with the rear elevated sufficiently to provide clearance to enable the open end of the cargo box to be closed by the tail gate.

Although beneficial results may be obtained through the use of the method and apparatus, as described above, some additional features add to the functioning of the invention.

Even more beneficial results may be obtained when the support is in the form of a beam with underlying legs. This ensures that the support does not preclude other items being stored in the cargo box. The support beam has a first end and a second end. It is preferred that the support beam have at two underlying legs, one of the underlying legs being positioned at the first end and another of the underlying legs being positioned at the second end. This minimizes the amount of cargo space taken by the support.

Even more beneficial results may be obtained when the underlying legs are pivotally attached to the support beam and pivotally movable between an operative position substantially perpendicular to the support beam and a stored position parallel to the support beam. This enables the support to be folded and put out of the way when not in use. It is preferred that a pivotal stop be provided to maintain the legs in the operative position, although the pivotal stop may be redundant as the peripheral sidewalls of the cargo box will also serve to maintain the legs in the operative position.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
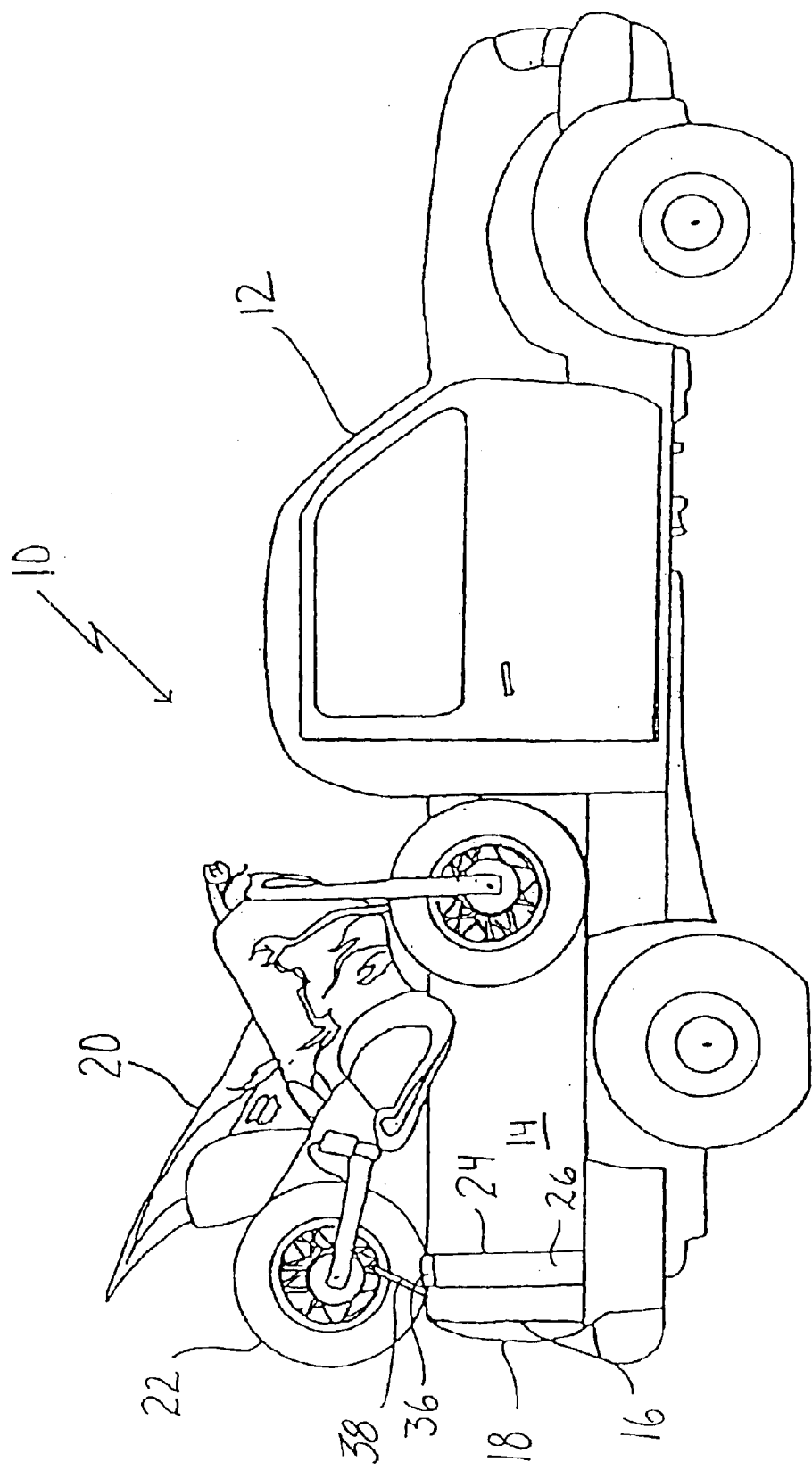
FIG. 1 is a side elevation view, in section, of a motorcycle being transported in accordance with the teachings of the present invention.

Preferred embodiments of a combination apparatus for transporting a recreational vehicle, generally indicated by reference numeral 10, will now be described. A combination which includes a motorcycle will be described with reference to FIGS. 1 through 4. A combination which includes a snowmobile will be described with reference to FIGS. 5 through 8.

Structure and Relationship of Parts:

Referring to FIG. 1, combination apparatus 10 includes a pickup truck 12 with a cargo box 14 that has an open end 16 closed by a tail gate 18. A motorcycle 20 is positioned in cargo box 14 of pickup truck 12 with a rear wheel 22 of motorcycle 20 protruding past open end 16 of cargo box 14.

Figure 2:
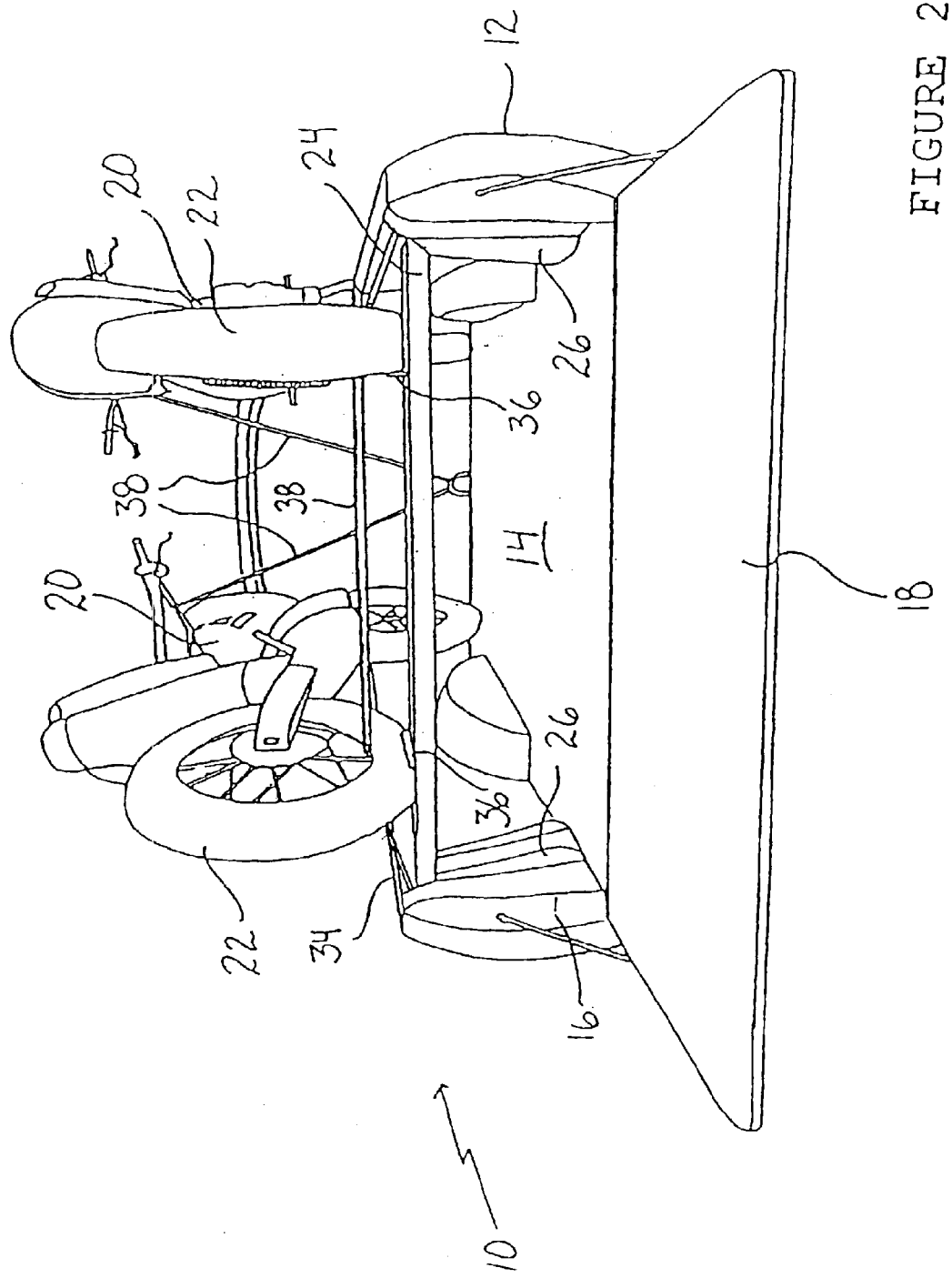
FIG. 2 is an end elevation view of the motorcycle being transported as illustrated in FIG. 1.
Figure 3:
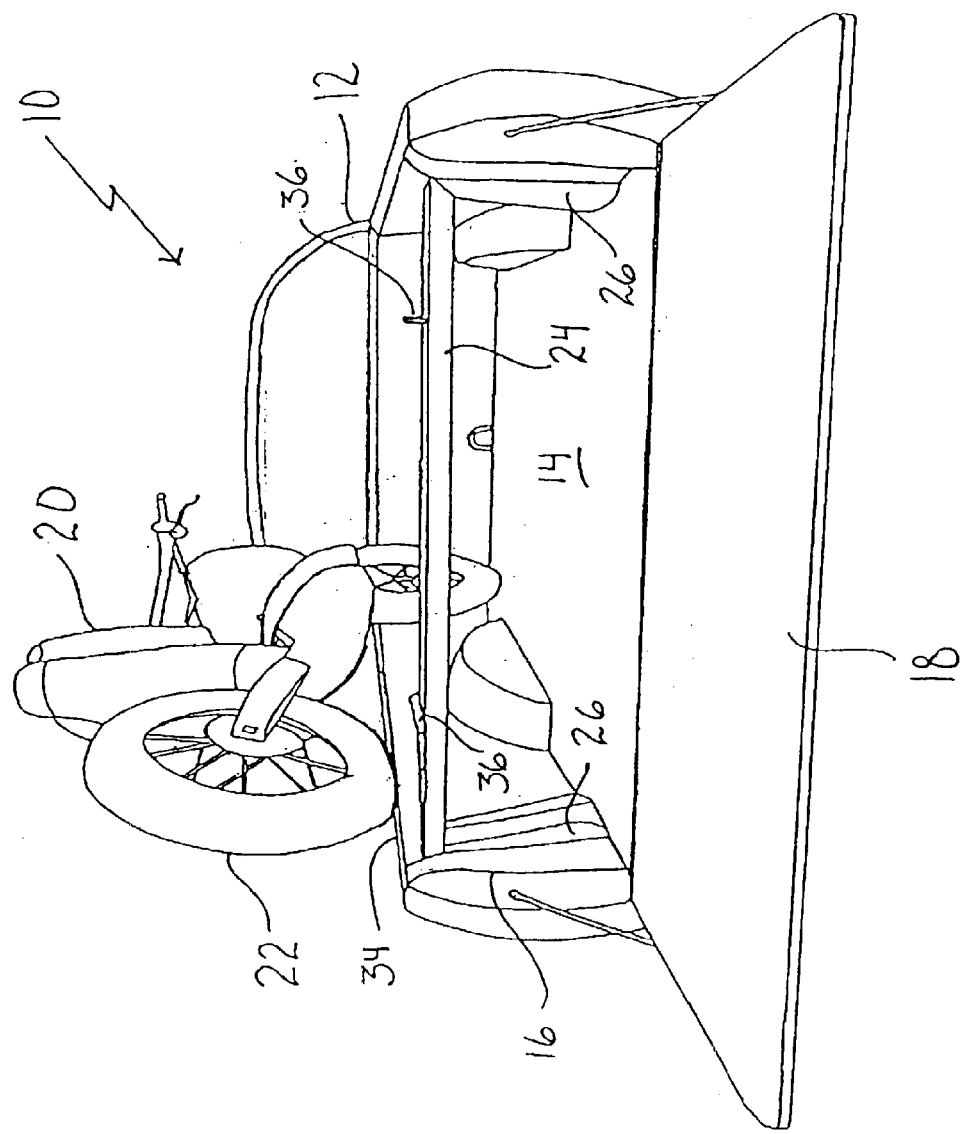
FIG. 3 is an end elevation view of the preferred manner of positioning the motorcycle in accordance with the teachings of the method while the support is being positioned in the cargo box.
Figure 4:
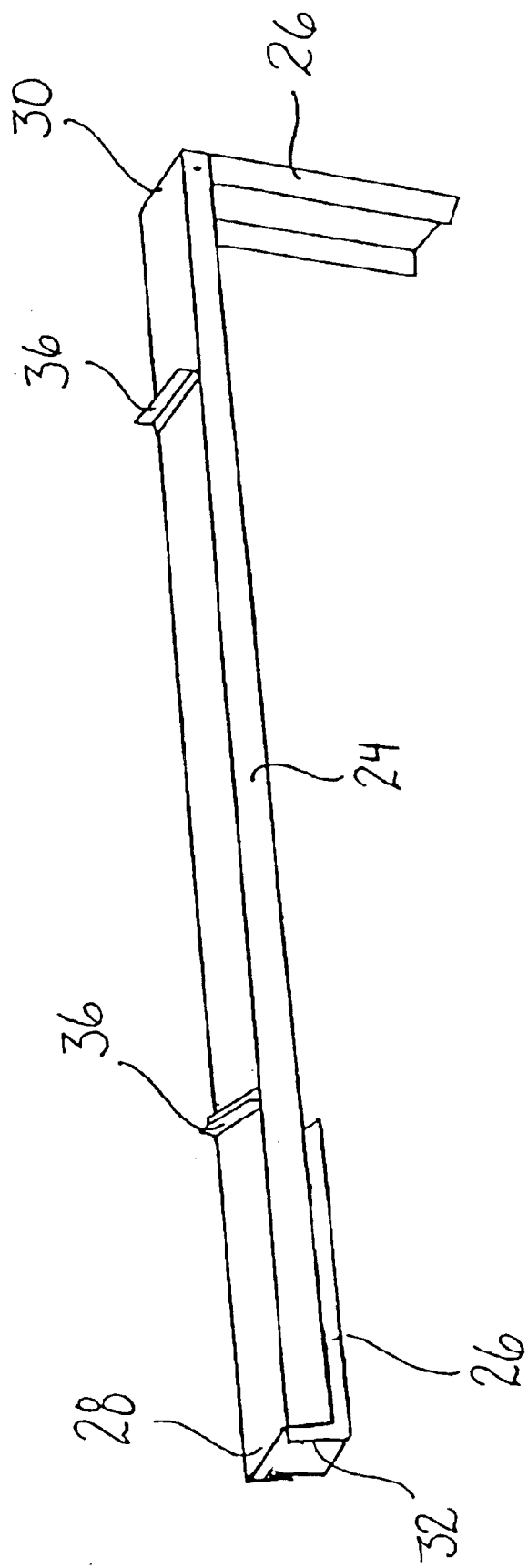
FIG. 4 is a perspective view of a support beam illustrated in FIG. 1.

Referring to FIGS. 2 and 3, a support beam 24 with underlying legs 26 is positioned in cargo box 14 adjacent to open end 16. Referring to FIG. 4, support beam 24 has a first end 30 and a second end 28. One of two underlying legs 26 is positioned at first end 30 and another of two underlying legs 26 is positioned at second end 28. Underlying legs 26 are pivotally attached to support beam 24 and pivotally movable between an operative position substantially perpendicular to support beam 24 and a stored position parallel to support beam 24. A pivotal stop 32 is provided to maintain underlying legs 26 in operative position. Referring to FIGS. 1 and 2, rear wheel 22 of motorcycle 20 rests upon support beam 24 with rear wheel 22 elevated sufficiently to provide clearance to enable open end 16 of cargo box 14 to be closed by tail gate 18.

Operation:

The use and operation of combination apparatus 10 will now be described with reference to FIGS. 1 through 4. Referring to FIG. 1, pickup truck 12, motorcycle 20, and support beam 24 are provided as described above. Referring to FIG. 3, motorcycle 20 is placed in cargo box 14 of pickup truck 12 with rear wheel 22 of motorcycle 20 protruding past open end 16. Rear wheel 22 of motorcycle 20 is lifted laterally onto a peripheral sidewall 34 of cargo box 14 adjacent to open end 16, while support beam 24 is positioned in cargo box 14 adjacent to open end 16 with underlying legs 26 positioned in the operative position.

Referring to FIGS. 1 and 2, rear wheel 22 of motorcycle 20 is then slid onto support beam 24. Support beam 24 elevates rear wheel 22 sufficiently so as to provide clearance to enable open end 16 of cargo box 14 to be closed by tail gate 18. With rear wheel 22 elevated on support beam 24 with underlying legs 26, there is still room in cargo box 14 of truck 12 for storage of other items.

Referring to FIG. 2, upstanding rear wheel positioning guides 36 are provided on support beam 24 to ensure that rear wheels 22 are properly positioned on support beam 24. As straps 38 securing motorcycles 20 are tightened, rear wheels 22 will tend to slide along support beam 24 coming to rest against wheel positioning guides 36.

It will be appreciated that when motorcycle 20 has been transported to a desired location, and has been unloaded from cargo box 14, support beam 24 can be removed from cargo box 14. Referring to FIG. 4, underlying legs 26 can be pivoted to the closed position for ease in storing support beam 24 until it is required again.

Figure 5:
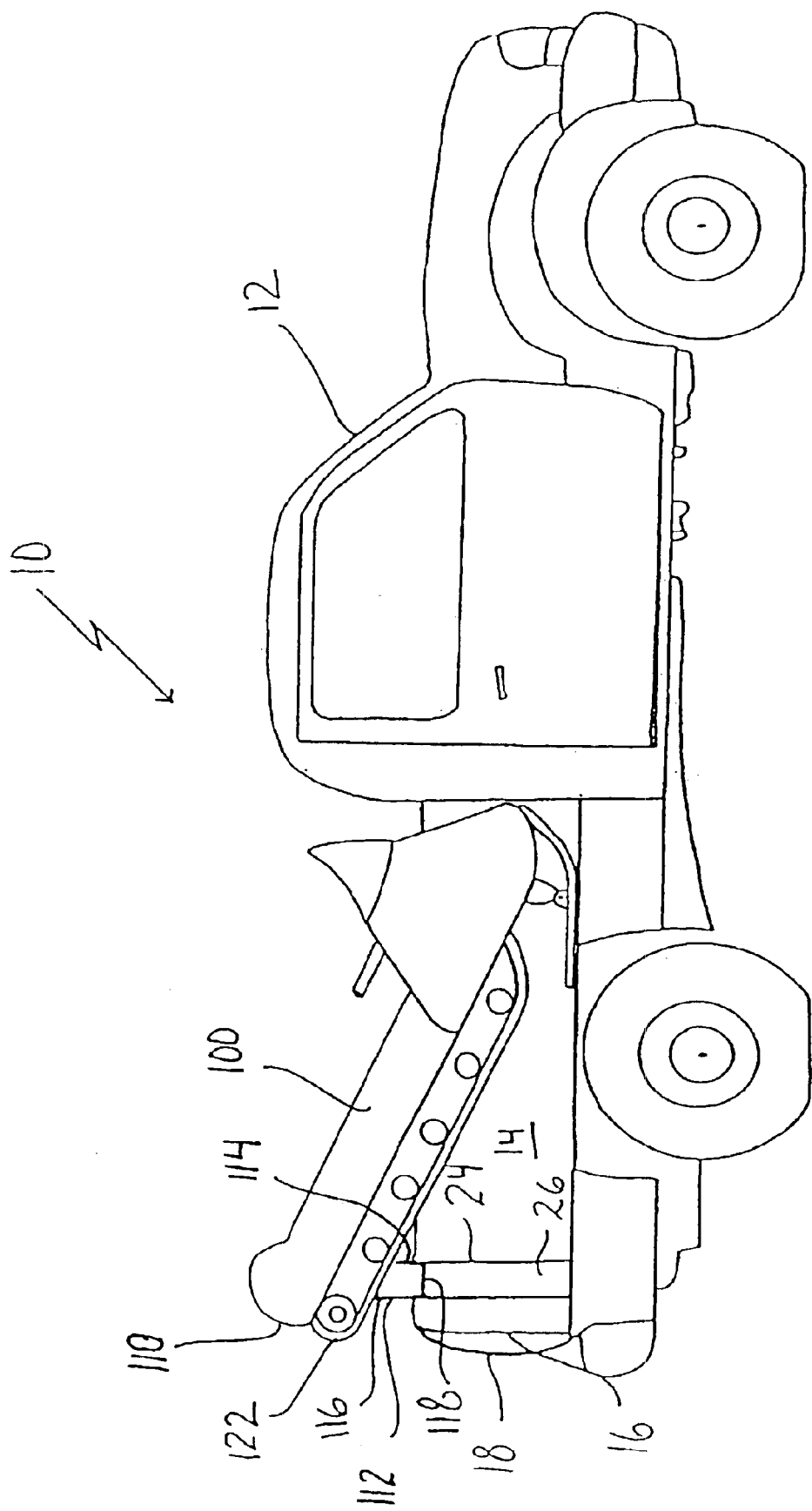
FIG. 5 is a side elevation view, in section, of a snowmobile being transported in accordance with the teachings of the present invention.

Structure and Relationship of Parts:

Referring to FIG. 5, combination apparatus 10 includes pickup truck 12 with cargo box 14 that has open end 16 closed by tail gate 18. A snowmobile 100 is positioned in cargo box 14 of pickup truck 12 with a rear portion 110 of snowmobile 100 protruding past open end 16 of cargo box 14.

Figure 6:
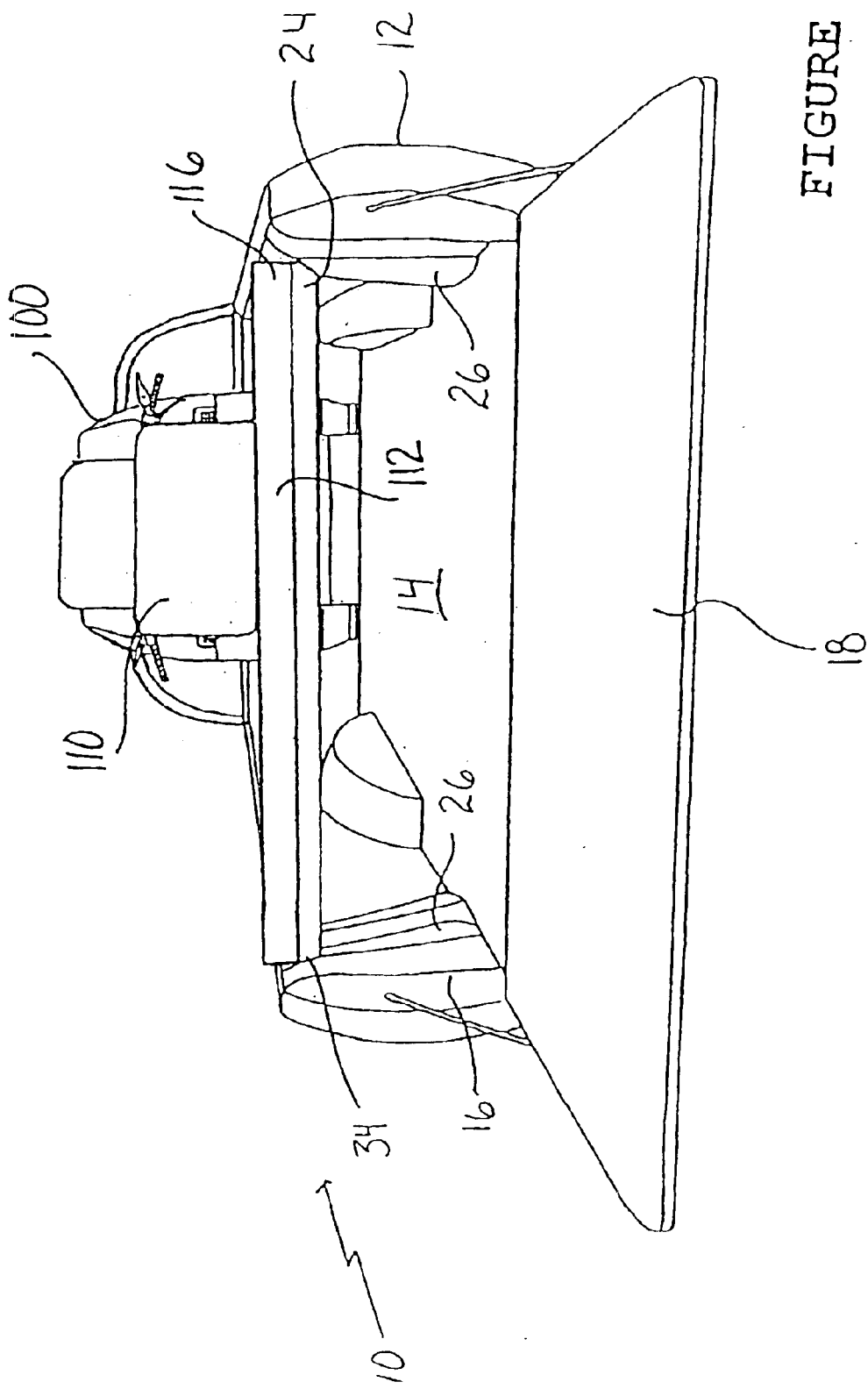
FIG. 6 is an end elevation view of the snowmobile being transported as illustrated in FIG. 5.
Figure 8:
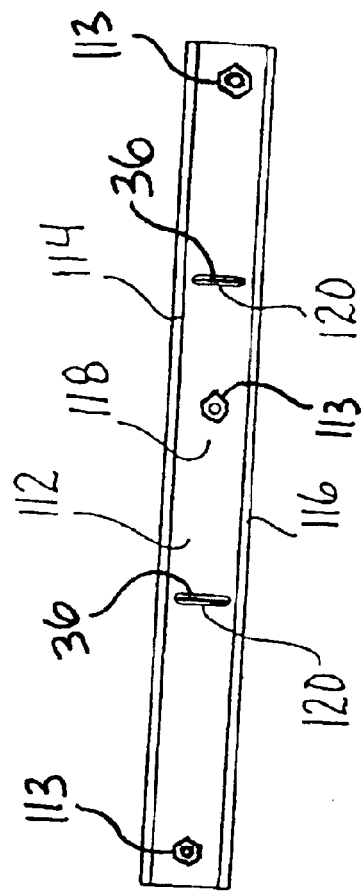
FIG. 8 is a top plan view of the angular top support bracket illustrated in FIG. 7.
Figure 7:
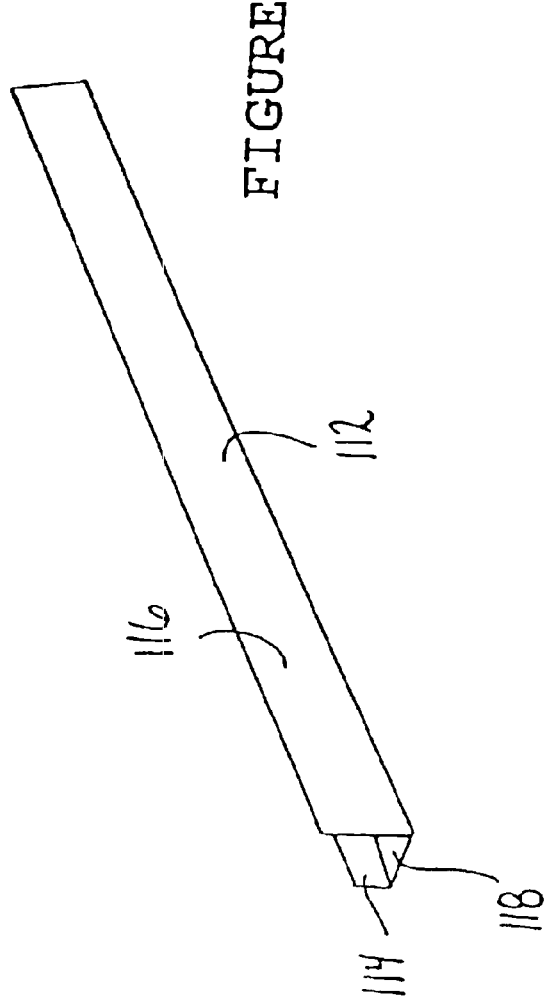
FIG. 7 is a perspective view of a top support bracket detachably secured to the support beam when transporting a snowmobile as illustrated in FIG. 5.

Referring to FIGS. 5 and 6, support beam 24 as described above is provided. Support beam 24 with underlying legs 26 is positioned in cargo box 14 adjacent to open end 16. To accommodate snowmobile 100, an angular top support bracket 112 is placed on support beam 24. Referring to FIG. 7, angular top support bracket 112 has a first upwardly extending longitudinal sidewall 114, a second upwardly extending sidewall 116, and an intermediate portion 118 spanning between first sidewall 114 and second sidewall 116. Referring to FIG. 8, intermediate portion 118 has slots 120 which are adapted to receive wheel positioning guides 36 of support beam 24. Referring to FIG. 7, first sidewall 114 is of a lower height than second sidewall 116 such that when a track 122 at rear portion 110 of snowmobile 100 is placed on angular top support bracket 112, angular top support bracket 112 engages track 122 of snowmobile 100 at an angle. In the absence of angular top support bracket 112, the force exerted by the weight of snowmobile 100 would exert a torsional force upon support beam 24. When the angularly positioned track 122 engages angular top support bracket 112, the resulting force vector is substantially downward upon support beam 24.

Referring to FIGS. 5 and 6, track of snowmobile 100 rests upon angular support bracket 112 with rear portion 110 elevated sufficiently to provide clearance to enable open end 16 of cargo box 14 to be closed by tail gate 18.

Operation:

The use and operation of combination apparatus 10 will now be described with reference to FIGS. 5 through 8.

Referring to FIGS. 5 and 6, pickup truck 12, snowmobile 100, support beam 24 and angular support bracket 112 are provided as described above. Angular top support bracket 112 is placed on support beam with wheel positioning guides 36 inserted through slots 120 on intermediate portion 118. Angular top support bracket 112 is then bolted onto support beam 24 with several bolts 113 illustrated in FIG. 8. Snowmobile 100 is placed in cargo box 14 of pickup truck 12 with rear portion 110 of snowmobile 100 protruding past open end 16. Rear portion 110 of snowmobile 100 is lifted, while support beam 24 is positioned in cargo box 14 adjacent to open end 16 with underlying legs 26 positioned in the operative position. Track 122 at rear portion 110 of snowmobile 100 is placed onto angular support bracket 112. Angular support bracket 112 allows for support of rear portion 110 of snowmobile 100 at an angle while support beam 24 elevates rear portion 110 of snowmobile 100 sufficiently so as to provide clearance to enable open end 16 of cargo box 14 to be closed by tail gate 18. With rear portion 110 of snowmobile elevated, there is still room in cargo box 14 of pickup truck 12 for storage of other items. Angular support bracket 112 allows for support of rear portion 110 of snowmobile 100 at an angle while support beam 24 elevates rear portion 110 of snowmobile 100 sufficiently so as to provide clearance to enable open end 16 of cargo box 14 to be closed by tail gate 18. With rear portion 110 of snowmobile elevated, there is still room in cargo box 14 of pickup truck 12 for storage of other items.

It will be appreciated that when seasons change and when pickup truck 12 is not required to transport snowmobiles 100, angular support bracket 112 can be removed from support beam 24 and support beam 24 is ready to be used with motorcycles 20. In the event, neither recreational vehicle has to be transported, support beam 24 and angular support bracket 112 can both be removed from cargo box 14 and placed in storage.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method for transporting a recreational vehicle, comprising the steps of:

providing a pickup truck having a cargo box with an open end closed by a tail gate;

placing the recreational vehicle in the cargo box of the pickup truck with a rear portion of the recreational vehicle protruding past the open end;

positioning a support beam with underlying legs into the cargo box adjacent to the open end, the underlying legs being pivotally attached to the support beam and pivotally movable between an operative position substantially perpendicular to the support beam and a stored position parallel to the support beam; and lifting the rear portion of the recreational vehicle onto the support beam until the rear portion is elevated sufficiently to provide clearance to enable the open end to be closed by the tail gate.

2. The method as defined in claim 1, wherein a pivotal stop is provided to maintain the underlying legs in the operative position.

3. The method as defined in claim 1, the support beam having a first end and a second end, the support beam having at least two underlying legs, one of the at least two underlying legs being positioned at the first end and another of the at least two underlying legs being positioned at the second end.

4. The method as defined in claim 1, the recreational vehicle being a motorcycle, the rear portion being a rear wheel and the support beam having at least one upstanding rear wheel positioning guide.

5. The method as defined in claim 1, the recreational vehicle being a snowmobile, the rear portion being a track and the support beam having an angular top support bracket adapted to engage the track at an angle.

6. A method for transporting a recreational vehicle, comprising the steps of:
   providing a pickup truck having a cargo box with a peripheral sidewall and an open end, the open end being closed by a tail gate;
   placing the recreational vehicle in the cargo box of the pickup truck with a rear portion of the recreational vehicle protruding past the open end;
   lifting the rear portion of the recreational vehicle laterally onto the peripheral sidewall of the cargo box adjacent to the open end;
   positioning a support beam with underlying legs into the cargo box adjacent to the open end, the underlying legs being pivotally attached to the support beam and pivotally movable between an operative position substantially perpendicular to the support beam and a stored position parallel to the support beam; and
   lifting the rear portion of the recreational vehicle onto the support beam until the rear portion is elevated sufficiently to provide clearance to enable the open end of the cargo box to be closed by the tail gate.

7. The method as defined in claim 6, wherein a pivotal stop is provided to maintain the legs in the operative position.

8. The method as defined in claim 6, the support beam having a first end and a second end, at least one of the underlying legs being positioned at the first end and another of the underlying legs being positioned at the second end.

9. The method as defined in claim 6, the recreational vehicle being a motorcycle, the rear portion being a rear wheel and the support beam having at least one upstanding rear wheel positioning guide.

10. The method as defined in claim 6, the recreational vehicle being a snowmobile, the rear portion being a track and the support beam having an angular top support bracket adapted to engage the track at an angle.

11. A combination, comprising:
   a pickup truck having a cargo box with an open end closed by a tail gate;
   a recreational vehicle in the cargo box of the pickup truck with a rear portion of the recreational vehicle protruding past the open end; and
   a support beam with underlying legs in the cargo box adjacent to the open end the underlying legs being pivotally attached to the support beam and pivotally movable between an operative position substantially perpendicular to the support beam and a stored position parallel to the support beam;
   the rear portion of the recreational vehicle resting upon the support with the rear portion elevated sufficiently to provide clearance to enable the open end of the cargo box to be closed by the tail gate.

12. The combination as defined in claim 11, wherein a pivotal stop is provided to maintain the legs in the operative position.

13. The combination as defined in claim 11, wherein the support beam has a first end and a second end, at least one of the underlying legs being positioned at the first end and another of the underlying legs being positioned at the second end.

14. The combination as defined in claim 11, wherein the recreational vehicle is a motorcycle and the support beam has at least one transverse upstanding rear wheel positioning guide whereby lateral movement of a rear wheel of the motorcycle is limited.

15. The combination as defined in claim 11, wherein the recreational vehicle is a snowmobile and the support beam has an angular top support bracket, whereby a track of the snowmobile is engaged at an angle.

16. The combination as defined in claim 15, wherein the angular top support bracket is detachable and has slots adapted to accommodate upstanding rear wheel positioning guides, and means being provided to detachably secure the top support bracket to the support beam.

17. A combination, comprising:
   a pickup truck having a cargo box with an open end closed by a tail gate;
   a motorcycle in the cargo box of the pickup truck with a rear wheel of the motorcycle protruding past the open end;
   a support beam with two underlying legs positioned in the cargo box adjacent to the open end, the support beam having a first end and a second end, one of the two underlying legs being positioned at the first end and another of the two underlying legs being positioned at the second end, the underlying legs being pivotally attached to the support beam and pivotally movable between an operative position substantially perpendicular to the support beam and a stored position parallel to the support beam, a pivotal stop being provided to maintain the legs in the operative position, the support beam having upstanding rear wheel positioning guides; and
   the rear wheel of the motorcycle resting upon the support beam against the wheel positioning guides with the rear wheel elevated sufficiently to provide clearance to enable the open end of the cargo box to be closed by the tail gate.

18. A combination, comprising:
   a pickup truck having a cargo box with an open end closed by a tail gate;
   a snowmobile in the cargo box of the pickup truck with a track of the snowmobile protruding past the open end;
   a support beam with two underlying legs positioned in the cargo box adjacent to the open end, the support beam having a first end and a second end, one of the two underlying legs being positioned at the first end and another of the two underlying legs being positioned at the second end, the underlying legs being pivotally attached to the support beam and pivotally movable between an operative position substantially perpendicular to the support beam and a stored position parallel to the support beam, a pivotal stop being provided to maintain the legs in the operative position, the support beam having an angular top support bracket; and
   the track of the snowmobile resting upon the support beam against the top support bracket engaging the track of the snowmobile at an angle, the track being elevated by the support beam to provide clearance to enable the open end of the cargo box to be closed by the tail gate.

* * * * *